United States Patent [19]
Pieper

[11] 3,742,111
[45] June 26, 1973

[54] METHOD AND FURNACE FOR THE ELECTRIC MELTING OF GLASS

[75] Inventor: Helmut Pieper, Lohr am Main, Germany

[73] Assignee: Ingenieurburo Glasofenbau Nikolas Sorg GmbH & Co. KG., Germany

[22] Filed: Jan. 3, 1972

[21] Appl. No.: 215,062

[30] Foreign Application Priority Data
Jan. 5, 1971 Germany................... P 21 00 335.0

[52] U.S. Cl. ....................................................... 13/6
[51] Int. Cl............................................... C03b 5/02
[58] Field of Search ............................................ 13/6

[56] References Cited
UNITED STATES PATENTS
3,583,861  6/1971  Preston ....................................... 13/6
2,993,079  7/1961  Augsburger............................... 13/6

Primary Examiner—Roy N. Envall, Jr.
Attorney—William E. Anderson, James J. Hamill et al.

[57] ABSTRACT

A method for melting glass and an electric melting furnace are disclosed in which upper and lower sets of electrodes are spaced vertically to cause separate flows of glass circulating within adjacent upper and lower planes in a manner limiting glass flow between the respective planes. The set of electrodes in the lower plane are positioned so that rising glass flows from the tips thereof within the lower plane move upwardly to intersect descending glass flows within the upper plane at the interface between the planes thereby limiting glass flow between the planes. Preferably, each of the electrodes in the lower plane is circumferentially staggered relative to the electrodes in the upper plane and the amount of energy applied to glass in the lower plane is greater than the amount of energy applied to the glass in the upper plane.

17 Claims, 13 Drawing Figures

METHOD AND FURNACE FOR THE ELECTRIC MELTING OF GLASS

The present invention relates to a method of producing glass in an electric melting furnace or hearth, whereby the energy is supplied in a plurality of planes or levels by resistance heating of the glass, and to an electric furnace for carrying out such method, whereby a mixture of raw materials is introduced into said furnace from the upper side thereof and the glass is withdrawn from the bottom of the furnace, said furnace comprising electrodes positioned in various planes or levels for supplying the electric energy.

Electric furnaces of the above-indicated type are used particularly to produce high quality glass since the melting and refining process can be controlled more exactly than in furnaces of the conventional construction. In particular, it is hereby possible to produce colored glasses of practically any desired color shade up to black, because the heat transmission is effected merely by resistance heating and not by radiation. In conventional furnaces, intensely colored types of glass prevent the heat transfer from the surface fire to the bottom of the trough which results in glass products being inhomogeneous in chemical and thermal respects.

There are already known electric furnaces which are constructed in the same manner as a conventional surface-heated furnace and wherein electrodes for resistance heating are arranged in a single place within a shallow basin. Although these furnaces have the advantage that the energy can be supplied into the glass melt not only through the surface of the melt but can be introduced into the glass melt proper, these furnaces, on the other hand, suffer from the disadvantage of having high thermal loss.

Furthermore, due to the relatively great volume of the glass melt there are present strong horizontal flows which prevent the production of glass of good homogeneity.

Also, there are known electric melting furnaces for the production of glass which have a greater depth of the glass melt and which comprise electrodes showing a certain distribution in vertical direction. However, it has been found that these modifications do not provide any substantial improvements as compared with conventional electrically heated glass furnaces because in such case the flow conditions likewise oppose the production of high-quality glass, and that especially for the reason that there are produced cold vertical marginal flows conveying unmolten and unrefined glass into deeper and colder portions of the furnace.

Finally, there has further been proposed a glass furnace wherein the energy supply should be effected in two planes by electrodes (German Pat. application 1, 916, 804 laid open to public inspection). However, in view of the fact that the electrodes of the separate planes are positioned in the same line of dip, according to this proposal the resulting vertical flows of the separate electrodes would add to each other. However, this combination results in a circulation flow extending over the complete furnace and preventing the production of homogeneous glass. Besides, the above mentioned publication discloses that the furnace should supply the major part of the energy in the upper most plane. Such supply of the major portion of the energy in the uppermost plane would result in a distribution of the temperature and of the viscosity of the glass, and that especially as according to said publication the mixture should be drawn deep into the melt in the center portion thereof which effectively prevents the necessary provision of separate layers and which would produce a temperature pattern within the furnace that does not correspond to the optimum pattern for the melting and refining process. Finally, in view of the fact that the above mentioned publication furthermore describes the pre-heating of the furnace during the starting phase by induction heating, while the unmolten mixture is not conductive to induction currents, the expert will not gather any useful teaching from this publication.

It is the object of the invention to avoid the above mentioned and other disadvantages of the prior art, and especially to provide a method and a furnace for the electric melting of glass, which method and which apparatus provide for high specific performance or efficiency due to which it is possible to melt glass of maximum homogeneity such that the glass has a high degree of brilliancy, which permit rapid and easy start-up of the furnace and variation of the type of glass to be processed, which result in low consumption of heat, which require only low costs of investition, which permit a ready control of operation and which render possible to melt by electric means also special types of glass, such as e.g. lead crystal glass, flour glasses and other types of glass showing a high degree of vaporization during the conventional melting process, by largely avoiding such vaporization and in more economical manner then heretofore possible. The method according to the invention should provide for the feature that the separate glass layers within the furnace are in mass exchange relation with each other only to such degree that only the quantity of glass withdrawn from the bottom flows between these planes or levels, and that the directions of flow within the furnace guaranty maximum protection of the wall material. Also, it is an object of the invention to keep the spacing between the electrodes as small as possible.

According to the invention, this object is solved in that there are separate flows of glass circulating within said planes in such manner that an ascending or rising glass flow of the respectively lower plane meets a descending or falling glass flow of the respectively upper plane at the interface between the planes, so as to prevent the glass flows from entering into the respectively other plane.

Advantageously, in the planes of the electrodes of the furnace, energy may be supplied in increasing amounts from above in downward direction up to a maximum value, while the amount of energy may decrease again in the planes above the bottom of the furnace the energy is supplied in decreasing amounts from above in downward direction. Furthermore, the mixture may be delivered onto the glass melt by leaving free some portions thereof which may form especially a peripheral zone, and gas which is formed during the melting of the mixture may flow out from beneath the mixture layer. Advantageously, the ratio between the energy supplied in an upper zone and that supplied in a zone therebelow may be between 0.3 and 0.8.

The furnace for carrying out the method according to the invention is characterized in that the inner ends of said electrodes of one plane within said furnace are positioned to lie in gaps between the ends of the electrodes in the planes thereabove and therebelow. Advantageously, in the uppermost planes the number of the electrodes provided in the respectively lower plane is equal to or greater than in the respectively upper plane, and in the deeper planes or levels the number of electrodes in the respectively lower plane or level is equal to or smaller than in the plane or layer there above.

Furthermore, for degassing the melting mixture, the furnace according to the invention advantageously includes means which distribute the delivered mixture while leaving free degassing holes. In order to maintain the obtained homogeneity of the glass, the furnace may be provided with auxiliary electrodes and with a lateral glass outlet to facilitate the production.

In order that the energy released in each zone can be distributed in the required manner, the electrodes of the various zone are preferably electrically isolated from each other. For the same reason, the number of phases advantageously corresponds to the number of electrodes or groups of electrodes in each zone. The phases of a three-phase alternating current may succeed each other in circumferential direction of the furnace.

In order to simplify the start-up operation and to improve the economy thereof, the furnace is preferably provided with means for surface heating and for electrically heating a glass melt covering the bottom surface.

It is the special merit of the present invention to disclose for the first time that the experts common assumption is wrong, namely that, on the one hand, the major portion of energy must be supplied in the uppermost zone of the electrode planes and the energy supply is then favorably decreased from above in downward direction, and that, on the other hand, the mixture layer at the head of the furnace should preferably be closed in order to avoid radiation of heat and losses in general.

On the contrary, the energy supplied must increase from above in downward direction, and the mixture layer must have holes in order to prevent the build up of a gas cushion isolating the mixture from the glass melt.

Owing to the fact that the object according to the invention is solved both by the individual measures and by their combination, both the individual measures as indicated above and their combination have to be considered as the subject matter of the invention.

In the following, exemplary embodiments of the invention are explained in greater detail by referring to the enclosed drawings, wherein.

As shown in the figures, the electric melting furnace according to the invention for the production of glass comprises a furnace chamber 2 constructed of refractory material 1 and resting on a foundation, which furnace chamber may include a (not illustrated) supporting framework. The refractory material may have an external insulation; for the better control of the electrode holders, such insulation is omitted in the vicinity of the electrodes.

The furnace chamber 2 comprises in the bottom plate 5 thereof a preferably non-central, possibly sunk or recessed outlet 4 which communicates e.g. with an upstanding (not illustrated) glass channel or passage wherein the glass stands in accordance with the principle of the communicating containers. The final glass product may be withdrawn from the upper end of this passage by means of a feeder channel or passage and a feeder or similar, suitable means.

In the glass passage and in the feeder passage, there may be provided additional electrodes (not shown) which maintain the glass on constant temperature during the outflow thereof, and which prevent the creation of temperature gradients. In this way, the glass may retain its high homogeneity obtained within the electric melting furnace according to the invention.

The furnace chamber 2 per se preferably has the configuration of a regular polygon, whereby the furnace has normally at least six corners. Advantageously, the number of corners may increase with increasing size of the furnace, and may be smaller in the case of smaller units.

Preferably, the upper side of the furnace chamber is enclosed by a not illustrated arch roof or crown into which a, likewise not illustrated, smokestack opens. Underneath the crown, there is disposed a gas or oil burner (not shown).

The furnace chamber 2 has a ratio between glass surface and height of e.g. about 1.0 to 1.4. Favorable results were obtained with a ratio of 1.2.

Under the crown there are further provided within the upper furnace chamber one or more, not illustrated, feed chutes for the mixture to be fed, which chutes may be formed preferably as vibration chutes, and there are provided one or more distribution means (not shown) for the mixture, which means may be formed e.g. as rotating stirring arms. The stirring arms and the vibration chutes are correspondingly driven by not illustrated driving means, e.g. electric motors.

Within the furnace chamber 2 proper, there are disposed operating electrodes 6 in a plurality of planes and in at least two planes with small spacing of e.g. from 100 to 300 millimeters above the bottom plate, while start-up electrodes 7 are positioned in a third plane. The electrodes are fed with multi-phase, preferably three-phase alternating current through not illustrated connections and transformers. Depending on the design of the furnace, the start-up electrodes, under certain circumstances, may also serve as operating electrodes in the operation of the furnace.

In the case of furnaces of larger size, the operating electrodes 6 may also be positioned in three or more planes instead of only two planes. The electrodes of one plane are connected to be electrically independent from those of the plane thereabove or therebelow; when three-phase alternating current is used, the number of electrodes is always three or a multiple of three. The number of electrodes in the uppermost planes is equal or increasing in downward direction; in the case of larger furnaces having a greater number of planes, a number of electrodes which decreases in downward direction may be employed in the lowermost planes.

The electrodes consist of a heat-resistant and conductive material, such as e.g. molybdenum, tin oxide or platinum. According to the invention, preferably the electrodes may be molybdenum rods being immersed into the glass melt up to a length of about 700 millimeters. If tin oxide is used, a substantially lesser depth of immersion will be chosen; in the case of platinum, it seems to be most favorable to use plate electrodes. The thickness of the molybdenum rods is in the order of some centimeters.

As it is known to the expert, the length and the thickness of the electrodes depend on the value of the current used. In smaller furnaces, the electrodes extend obliquely into the furnace chamber; in larger furnaces, a radial arrangement becomes possible. When using tin oxide as the electrode material, the radial arrangement seems to be advantageous, too.

The electrodes of one plane are each staggered relative to the electrodes of the planes therebelow and thereabove, i.e. the tips of the electrodes are each disposed with their vertical projection between the vertical projection of the tips of the electrodes of the planes thereabove and therebelow.

Figure 1:
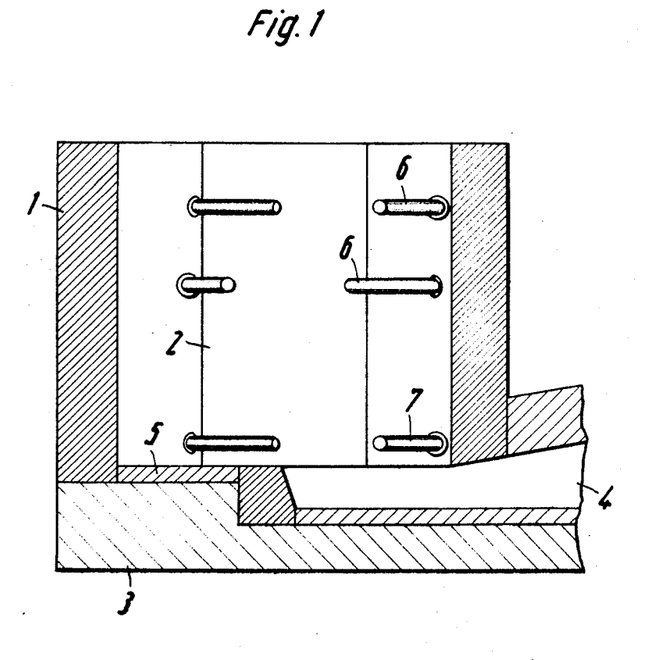
FIG. 1 is a vertical section through an electric melting furnace embodying the invention.
Figure 2:
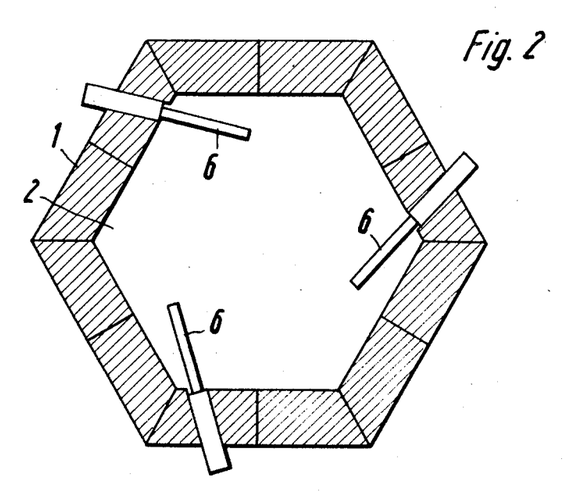
FIG. 2 is a horizontal section through the uppermost and lower most electrode plane or level of a furnace according to FIG. 1.
Figure 3:
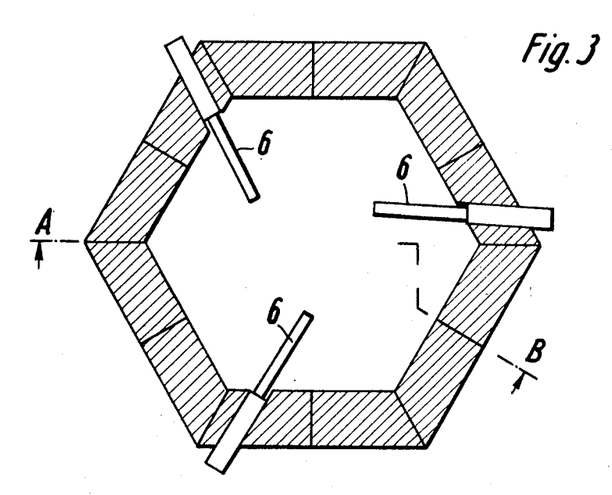
FIG. 3 is a horizontal section through the second electrode plane of a furnace according to FIG. 1.
Figure 4:
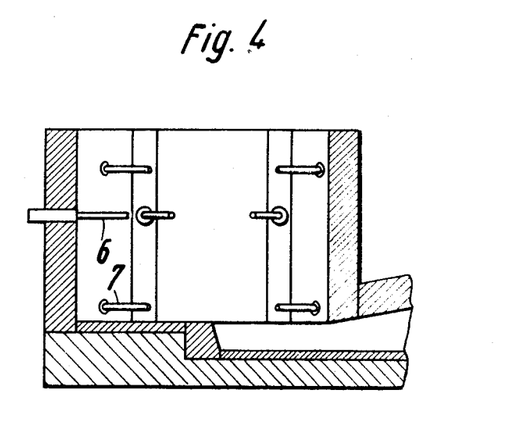
FIG. 4 is a vertical section through an electric melting furnace according to the invention with higher capacity, on a smaller scale.
Figure 5:
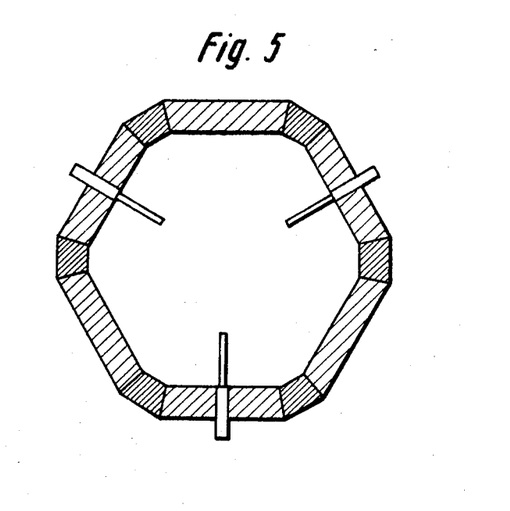
FIG. 5 is a horizontal section through the uppermost and the lower most electrode plane of a furnace according to FIG. 4.
Figure 6:
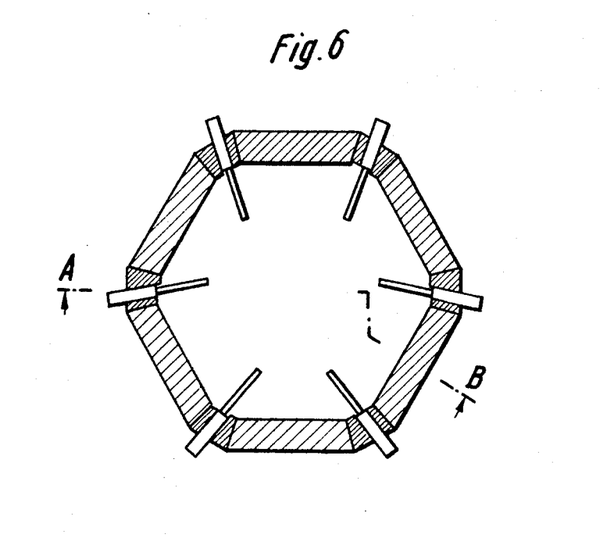
FIG. 6 is a horizontal section through a lower plane of a furnace according to FIG. 4.
Figure 7:
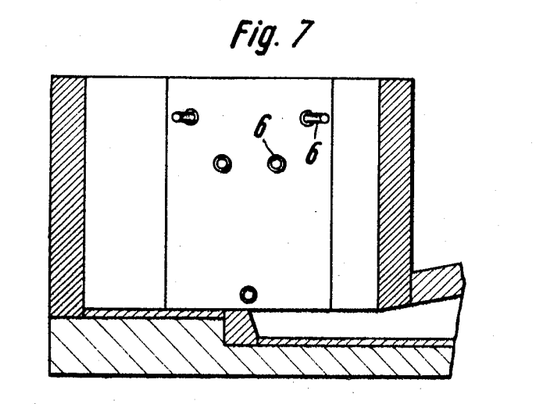
FIG. 7 is a vertical section through an electric melting furnace according to the invention and having a lowermost plane disposed in low position.
Figure 8:
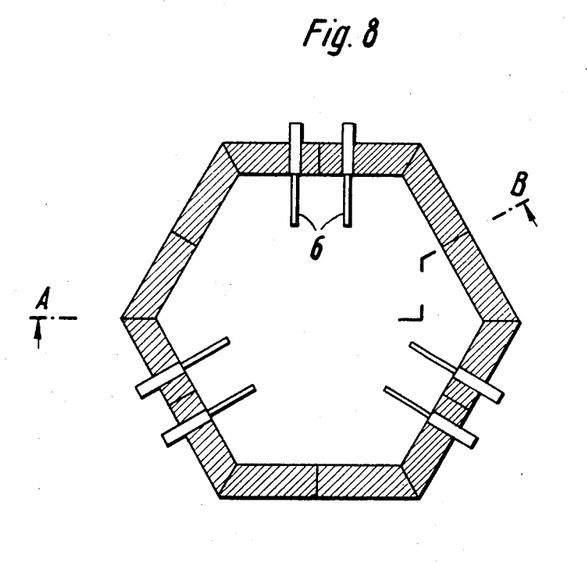
FIG. 8 is a horizontal section through the second electrode plane or level of the furnace according to FIG. 7.
Figure 9:
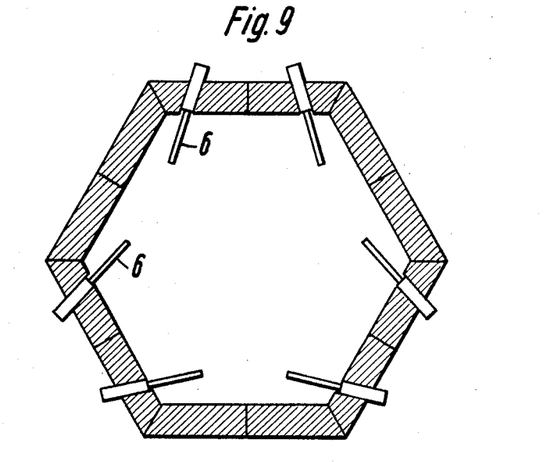
FIG. 9 is a horizontal section through the uppermost electrode plane of the furnace according to FIG. 7.
Figure 10:
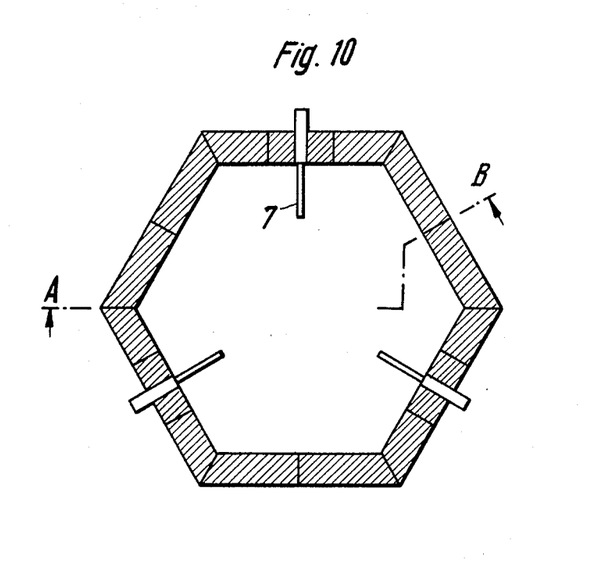
FIG. 10 is a horizontal section through the lowermost electrode plane of the furnace according to FIG. 7.
Figure 11:
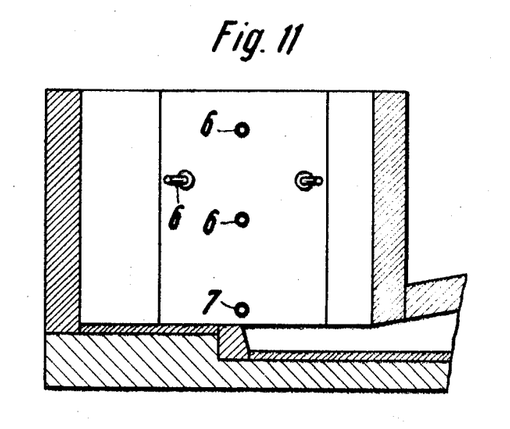
FIG. 11 is a vertical section through an electric melting furnace according to the invention and having three operative planes.
Figure 12:
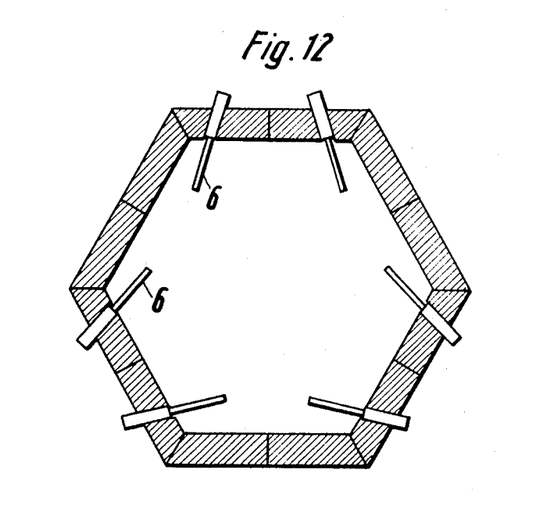
FIG. 12 is a horizontal section through the second plane of the furnace according to FIG. 11.
Figure 13:
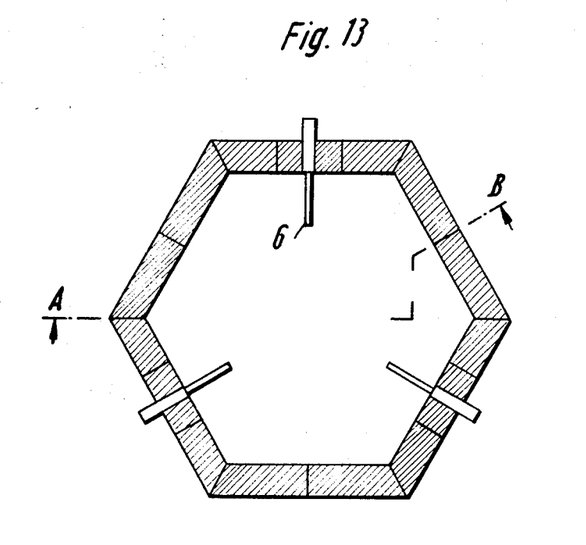
FIG. 13 is a horizontal section through the first and the third operative planes of the furnace according to FIG. 11.

In a hexagonal furnace as according to FIGS. 4 to 6, the electrodes extending into the furnace chamber, therefore, in the uppermost plane are disposed in the straight furnace wall, whereas the electrodes of the second plane, which in the case of six electrodes are staggered or displaced by 30°, are passed through the corners. According to FIGS. 4 to 6 and 11 to 13, the number of electrodes e.g. in the uppermost plane may be three and six in the plane therebelow, while according to FIGS. 1 to 3 three obliquely extending electrodes each are positioned in the uppermost plane and in the second plane, and according to FIGS. 7 to 10, the upper two planes each include six electrodes. Advantageously, the third operative plane includes the same number of electrodes as the first plane, i.e., three electrodes according to FIGS. 11 and 13.

In the lowermost plane, the "start-up plane," there are provided three electrodes in each case, i.e., the minimum number of electrodes in the case of three-phase alternating current. When using three-phase alternating current, the electrodes are connected in such way that the phases succeed each other in the sequence of RST, RST along the circumference. Now, the electrode planes are supplied with energy increasing from the upper plane to the lowermost plane. In large furnaces, the energy supplied to the lowermost planes may be reduced again, whereby the position of the energy maximum depends on the type of glass and on the capacity of the furnace.

The above described increases in the number of electrodes within the adjacent planes in downward direction serves the purpose that the load of each individual electrode does not become too great in spite of the increased amount of energy supplied.

In the operation of the furnace, due to the preferred arrangement of connection of the electrodes, the current flows from one electrode mainly to an adjacently disposed electrode. Hereby, due to the condensation of the lines of equal current density, an increased generation of heat will occur in the tip of the electrode, and there occurs a rising point where the glass heated to greater degree flows upwardly. The corresponding downward movement occurs in the area or intermediate space between the electrodes where heat generation is small, and since an electrode forms a rising point in the intermediate space between the electrodes of the next lower plane because of the above described staggered arrangement, over which rising point there is formed an upwardly moving glass flow, these two glass flows meet each other at the interface of the electrode planes, whereby they deflect each other and each flow prevents the other glass flow from penetrating into its respective plane.

Although a strong, circulating and intermixing flow is produced within the individual planes in this manner, this prevents the circulating motions from adding themselves to each other whereby it is avoided that inhomogeneous and unrefined glass flows to the outlet. The flow distribution within the planes as according to the invention allows to obtain optimum homogeneity of the glass. Furthermore, it is readily possible to effect a remelting of the furnace, i.e., the change over of the furnace to another type of glass, because the individual planes are successively filled from above to below by the new type of glass when the old type of glass is withdrawn at the bottom, whereby greater quantities of the old type of glass are not permitted to flow into the upper planes so as to contaminate the new glass therein. The otherwise necessary, time-consuming "cleaning by operating" of the furnace can be renounced with.

On the other hand, however, the circulating flow within the individual planes is of such magnitude that substantial specific efficiencies may be obtained in the glass melting furnace according to the invention. In a relatively small test furnace having a depth of the melt of 1.5 meters and a diameter of 1.5 meters, a capacity of 5 tons/m$^3$/d was obtained in the melting of various types of glass. The furnace had two operative planes each including three electrodes, as according to FIGS. 1 to 3.

Furthermore, the high turbulence being limited to the respective melting plane produces an extremely uniform temperature distribution of the glass which results in an excellent quality of the glass unequalled to by other furnaces. The combination of specific efficiency and glass quality as obtained by the electric furnace according to the invention is absolutely surprising to the expert. Special characteristics of the glass molten in this manner are brilliancy, freedom from bubbles and homogeneity. In the furnace according to the invention, it is possible without difficulty to produce temperatures of up to 1,600°C in the central zone of the furnace.

An essential feature of the electric furnace according to the invention resides in the fact that the mixture is not continuously spread over the surface of the melt, and that there are produced places which are covered by a thin layer of the mixture or by no mixture at all. As it has shown surprisingly, the gas produced during the melting of the glass may escape through these places from the intermediate layer between the mixture and the glass melt, which gas, otherwise, would have had an insulating effect. In this way, it is possible to guaranty uniform melting of the mixture over the total cross-section of the furnace, which results in a surprisingly good quality of the glass already in the uppermost plane of the furnace.

The places having only a slight coat of the mixture can be obtained in the furnace according to the invention in that a stirring mechanism or agitator rotating coaxially to the furnace, does not pass through the corners of the hexagonal furnace chamber. Furthermore, the lesser coating of the peripheral portion of the furnace prevents the generation of cold glass flows depending deep into the melt at the furnace walls.

Start-up of the furnace according to the invention is as follows:

The bottom 5 of the furnace is filled with a layer of broken glass which is molten by means of the burners e.g. at temperatures of about 900°C. Then the auxiliary or start-up electrodes 7 are activated, and the furnace chamber may then be filled with molten glass by supplying energy via the auxiliary electrodes, whereby the respectively immersed operating electrodes may be used for energy supply, too. When the furnace chamber is filled, the burner or the burners are deactivated and the furnace is fully placed into operation.

As it can be seen, the electric glass production furnace according to the invention is of extremely simple construction and the construction costs of this furnace are low when considering its throughput capacity, so that the higher cost of the electrical energy can be compensated in consideration of the low losses due to the small surface area of this furnace, and the production cost of the glass on the whole are less than that of conventional furnaces of similar size and similar purpose. Add hereto the simple handling or operation of the furnace which, due to its small surface area, without more ado can be operated in intervals, e.g. 8 hours of operation and 16 hours shut down, without any substantial shutdown losses.

What is claimed is:

1. A method of producing glass in an electric melting furnace having upper and lower sets of electrodes spaced vertically to cause separate flows of glass circulating within adjacent upper and lower planes, said method comprising the steps of: applying energy through each of the electrodes of the upper set to the glass in the upper plane causing ascending flows of glass at the tips of the electrodes of the first set and descending flows of glass in the circumferential spaces between adjacent electrodes of said first set, applying energy through each of the electrodes of the lower set to the glass in the lower plane causing rising flows of glass at the tips of the second set of electrodes, and intersecting each of said rising flows in said lower plane with descending glass flows moving downwardly between electrodes of the upper set at an interface between planes to limit glass flow between the respective planes.

2. A method of producing glass in an electric melting furnace having upper and lower sets of electrodes spaced vertically to cause separate flows of glass circulating within adjacent upper and lower planes, said method comprising the steps of: applying energy through each of the electrodes of the upper set to the glass in the upper plane causing ascending flows of glass at the tips of the electrodes of the first set and descending flows of glass in the circumferential spaces between adjacent electrodes of said first set, applying energy through each of the electrodes of the lower set to the glass in the lower plane causing rising flows of glass at the tips of the second set of electrodes, and intersecting said rising flows of glass of said lower plane with descending glass flow at said upper plane at an interface between the planes, and applying a greater amount of energy to the glass in the second plane than the amount of energy applied to the glass in the upper plane.

3. The method according to claim 2 including the further step of applying energy in decreasing amounts in planes below said lower plane and extending to said furnace bottom.

4. The method according to claim 2, characterized in that the mixture is fed onto the glass melt by leaving free some poritons thereof.

5. The method according to claim 4, characterized in that the mixture is fed onto the glass melt while leaving free a peripheral zone thereof.

6. The method according to claim 4 characterized in that the gas produced during the melting of the mixture is permitted to flow out from below the mixture layer.

7. The mixture according to claim 2, characterized in that the ratio between the energy supplied in an upper plane and the energy supplied in the plane therebelow is between 0.3 and 0.8.

8. In an electric glass melting furnace, the combination comprising: means including a peripheral side wall and a bottom wall defining a chamber for receiving raw materials at the upper end thereof, means for withdrawing melted glass from the lower end of said chamber, a first set of electrodes in an upper plane spaced circumferentially from each other for supplying electrical energy to glass in the first plane, a second set of electrodes positioned in a second plane within said chamber for supplying electrical energy to said glass in said second plane, each of said electrodes of said second set being spaced and offset circumferentially from a vertical plane through an overhead one of said electrodes of said first set, and tips of both said first and second sets of electrodes projecting substantially outward of said peripheral side wall and generating at their respective tips ascending glass flows to meet at an interface between said planes a descending glass flow from the other plane.

9. The glass melting furnace according to claim 8, characterized in that in the uppermost planes the number of the electrodes in the respectively lower plane is each equal to or greater than in the respectively upper plane.

10. The glass melting furnace according to claim 8, characterized in that in the lowermost planes the number of the electrodes of the respectively lower plane is equal to or smaller than in the plane thereabove.

11. The glass melting furnace according to any one of claim 8, characterized by including means which distribute the charge mixture while leaving free degassing holes.

12. The glass melting furnace according to any one of claim 8, characterized in that auxiliary electrodes are provided in the glass outlet passage.

13. The glass melting furnace according to any one of claim 8, characterized in that it comprises a lateral glass outlet.

14. The glass melting furnace according to any one of claim 8, characterized in that electrodes of the individual planes are electrically isolated from each other.

15. The glass melting furnace according to claim 14, characterized in that the number of the phases corresponds to the number of electrodes or electrode groups.

16. The glass melting furnace according to claim 15, characterized in that the phases of a three-phase alternating current succeed each other in circumferential direction of the furnace.

17. The glass melting furnace according to claim 8 characterized by means for the surface heating and for electrical heating of a glass melt covering the bottom surface.

* * * * *